(12) United States Patent
Burger (10) Patent No.: US 7,397,806 B2
(45) Date of Patent: Jul. 8, 2008

(54) METHOD FOR INTEGRATION OF A PACKET-ORIENTED NETWORK INTO A COMMUNICATION SYSTEM

(75) Inventor: Christian Burger, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 874 days.

(21) Appl. No.: 10/724,363

(22) Filed: Dec. 1, 2003

(65) Prior Publication Data

US 2004/0131163 A1 Jul. 8, 2004

(30) Foreign Application Priority Data

Nov. 29, 2002 (DE) ............................... 102 55 923

(51) Int. Cl.
*H04L 12/28* (2006.01)
*H04L 12/56* (2006.01)
*H04J 3/16* (2006.01)
*H04J 3/22* (2006.01)

(52) U.S. Cl. ..................... 370/398; 370/410; 370/422; 370/467; 379/88.17; 379/90.01

(58) Field of Classification Search .............. 370/398, 370/422, 410, 467; 379/88.17, 90.01
See application file for complete search history.

(56) References Cited

U.S. PATENT DOCUMENTS

| 5,195,128 | A | * | 3/1993 | Knitl ........................ 379/88.24 |
| 5,796,920 | A | * | 8/1998 | Hyland ......................... 706/20 |
| 5,854,897 | A | * | 12/1998 | Radziewicz et al. ......... 709/224 |
| 6,094,479 | A | * | 7/2000 | Lindeberg et al. ...... 379/220.01 |
| 6,226,287 | B1 | * | 5/2001 | Brady ......................... 370/352 |
| 6,434,143 | B1 | * | 8/2002 | Donovan ..................... 370/356 |
| 6,636,596 | B1 | * | 10/2003 | Gallant et al. .......... 379/220.01 |
| 6,795,430 | B1 | * | 9/2004 | Ong et al. ................... 370/352 |
| 6,947,531 | B1 | * | 9/2005 | Lewis et al. ............ 379/114.13 |
| 7,180,984 | B1 | * | 2/2007 | Samarasinghe .......... 379/88.13 |
| 7,277,534 | B1 | * | 10/2007 | Buerck et al. .......... 379/220.01 |
| 2001/0028654 | A1 | | 10/2001 | Anjum et al. |

(Continued)

FOREIGN PATENT DOCUMENTS

EP 1202542 5/2002

(Continued)

OTHER PUBLICATIONS

German Exam Report for Application 2002P18427 DE issued on Nov. 23, 2005.

(Continued)

*Primary Examiner*—Seema S. Rao
*Assistant Examiner*—Xavier Szewai Wong
(74) *Attorney, Agent, or Firm*—Staas & Halsey LLP (57) ABSTRACT

A method for Integration of a packet-oriented network in a communication system has at least one central communication device embodied with an application interface for exchange of communication data with a computer system, with a number of communication control processors assigned to the packet-oriented network for implementation of decentralized signaling and user data services, with a gateway for bilateral exchange of signaling and user data of the central communication device and of data exchanged by the decentralized signaling and user data services. In a control processor in this case communication data of the application interface and status information that can be processed for the communication control processors is bilaterally exchanged.

20 Claims, 7 Drawing Sheets

U.S. PATENT DOCUMENTS

| | | | |
|---|---|---|---|
| 2002/0110113 | A1 | 8/2002 | Wengrovitz |
| 2002/0118675 | A1* | 8/2002 | Strathmeyer et al. ......... 370/352 |
| 2003/0023730 | A1* | 1/2003 | Wengrovitz et al. ......... 709/227 |
| 2003/0152068 | A1* | 8/2003 | Balasaygun et al. ......... 370/356 |
| 2003/0172073 | A1* | 9/2003 | Brodsky ..................... 707/10 |
| 2003/0225866 | A1* | 12/2003 | Hudson ..................... 709/221 |

FOREIGN PATENT DOCUMENTS

| | | | |
|---|---|---|---|
| JP | 03088534 A | * | 4/1991 |
| JP | 05336559 A | * | 12/1993 |

OTHER PUBLICATIONS

Mitel Corporation: Mitel Data Integrated Voice Applications (DIVA) Architecture. White Paper, Release 1, Mar. 2000 (Mitel Corporation, PN 9190-962-086-NA, Issue 1.) Kanata, Ontario, Canada: Mitel 2000.

Anjum, Farooq; Caruso, Francesco; Jain, Ravi et al.: Chai Time: A system for Rapid Creation of Portable Next-Generation Telephony Service Using Third-Party Software Components IEEE Second Conference on Open Architectures and Network Programming OPENARCH '99, New York, NY, Mar. 26-27, 1999, Proceedings, pp. 22-31.

Gbauidi, Constant; Hubaux, Jean-Pierre; Pacifici, Giovanni et al.: Integration of Internet and Telecommunications: An Architecture for Hybrid Services. IEEE Journal on Selected Areas in Communications, vol. 17, No. 9, Sep. 1999, pp. 1563-1579.

Cronin, Paul: An Introduction to TSAPI and Network Telephony. IEEE Communications Magazine, vol. 34, No. 4, Apr. 1996, pp. 48-54.

Krauβ, Dietmar; Nolden, Matthias: CTI-Techniken und Standards. Funkschau, Heft 10, 1998, S. 44-48.

Internet-Welle erreicht Call Center von Jochen Ewe, Nov. 27, 1998.

Standard ECMA-179 Services for Computer Supported Telecommunications Applications (CSTA) Phase I Jun. 1992.

Standard ECMA-180 Protocol for Computer Supported Telecommunications Applications (CSTA) Phase I Jun. 1992.

* cited by examiner

METHOD FOR INTEGRATION OF A PACKET-ORIENTED NETWORK INTO A COMMUNICATION SYSTEM

CROSS REFERENCE TO RELATED APPLICATIONS

This application is based on and hereby claims priority to German Application No. 10255923.6 filed on Nov. 29, 2002, the contents of which are hereby incorporated by reference.

BACKGROUND OF THE INVENTION

The invention relates to a method and a system for integration of a packet-oriented network into a communication system.

Contemporary communication systems are characterized by the convergence of information and communications infrastructures. In such cases communication systems are known which support voice and/or video communication via packet-oriented networks. This type of system is known mostly in technical circles by the generic term of 'Voice over IP' or is abbreviated to 'VoIP', with the abbreviation 'IP' standing for 'Internet Protocol' a generally widely-used protocol for exchange of data over packet-oriented networks. For VoIP communication the H.323 or SIP (Session Initiation Protocol) protocols are widely used.

SIP is a signaling protocol for Internet telephony as well as for other services such as conference interactions, event notification, message switching etc. This protocol was developed by the Working Group MMUSIC (Multiparty Multimedia Session Control) of the Working Group IETF (Internet Engineering Task Force). The H.323 Standard is an international ITU-T (International Telecommunication Union—Telecommunications Standardization Sector) standard for voice, data and video communication over packet-switching networks.

As well as an infrastructure for exchanging packet-oriented data, a telephony infrastructure with fixed lines to communication terminals continues to be widely used. For economic and security reasons therefore there is in many systems no provision for any wholesale changeover to a purely packet-oriented architecture. Despite this, existing communication systems with a fixed line-based telephony infrastructure have been extended by devices for connection of communication terminals based on a packet-oriented network. These types of communication systems are thus often referred to as 'convergent' communication systems, which indicates a convergence of the two types of infrastructure.

In communication systems with a telephony infrastructure based on fixed line assignments the communication terminals are controlled by a central communication device.

The central communication device makes service features available and transfers information between communication system-internal or external communication terminals.

By contrast, in the architecture of purely packet-oriented VoIP communication systems there is no provision for central switching and control of communication partners, but instead the control of switching and service features in purely VoIP communication systems is undertaken decentrally in the communication terminals or in distributed control server systems.

Thus for a comprehensive integration of VoIP-based communication terminals into a convergent communication system a purely bilateral conversion of packet-oriented and streamed user information—i.e. voice or video data—is not sufficient. In addition a convergent communication system requires a conversion of signaling information between the two infrastructures. Signaling information contains data for connection control, signaling etc.

In 'classical'—i.e. centralized communication devices switching is undertaken for example in accordance with the principle of a time division multiplex between communication terminals with fixed line assignments—the signaling protocol 'DSS1' is thus known. The DSS1 ('Digital User System No. 1') protocol is a European ISDN ('Integrated Services Digital Network') protocol based on ITU-T 1.411 ('International Telecommunication Union') for the signaling channel of the European Euro-ISDN.

In modern communication systems signaling information additionally includes data to support expanded service features, e.g. to display a name and further Information of a calling or called user at a communication terminal.

With the use of expansion modules—also known in technical circles as 'gateways'—for 'classical' communication devices to connect VoIP communication terminals, the entire range of service features is not currently available either at wired or at VoIP communication terminals.

SUMMARY OF THE INVENTION

One potential object of the invention is to allow an integration of a packet-oriented network into a communication system with a central communication device, in which case both the central communication device and the communication terminals assigned to the packet-oriented network are to feature an identical service feature embodiment.

The inventor proposes a gateway and a communication control server are used for integration of a packet-oriented network at a communication system controlled by a central communication device. The gateway provides bilateral conversion of signaling and payload of the central communication device into data exchanged by decentralized signaling and payload services. These decentralized signaling and payload services are executed in communication control servers distributed across the packet-oriented network. In a control server connected to an application interface of the central communication device communication data of this application interface is converted into status information that can be processed for the communication control server.

A significant advantage of the method can be seen in the fact that with the bilateral conversion of communication data of the application interface and of status information transferred in the packet-oriented network a uniform service feature embodiment is available all communication terminals in the communication system.

In this way for example a VoIP (Voice over Internet Protocol) communication terminal connected to the packet-oriented network can be registered at the central communication device, something which cannot be implemented by exclusive using a gateway. Depending on its function, the gateway can merely undertake a bilateral conversion of packet-oriented signaling and payload into signaling and user information that can be evaluated by the central communication device, with the signaling data exchanged with the central communication device not being sufficient for control and signaling of all functions and service features.

Furthermore it is advantageous that, to implement the solution, an interface for exchanging communication data with a server system is used that is realized in the form of an application interface in many central communication devices. A constructional embodiment of the central communication device is thus not necessary to realize the method.

In an advantageous way the widely-available SIP(Session Initiation Protocol) protocol will be used for data which is exchanged in the packet-oriented network between decentralized signaling and payload services. For definition of the structure and the layout of exchanged data in accordance with the SIP-protocol the reader should refer to the document published in electronic form entitled Handley, M. et al.: 'SIP: Session Initiation Protocol', Network Working Group (Hrsg.), Request for Comments: 2543, March 1999.

In an advantageous way the widely-available standard CSTA (Computer Supported Telephony Applications) will be used for communication with the application interface. CSTA is a standard of the ECMA (European Computer Manufacturers Association) for computer-based telecommunications applications for linkage of computer systems and telephony devices. This linkage is also known among experts as 'Computer Telephony Integration', abbreviated to CTI. The CSTA standard defines the layout and the type of messages for the different service features. CSTA does not this involve a specific interface but far more a guideline for standardized implementation of a CTI functionality. Programming interfaces TSAPI and TAPI can be cited as examples of the standardized implementation that build on the CSTA definitions.

For definition of the structure and the layout of exchanged communication data in accordance with the CSTA Standard the reader is referred for example to the following documents published in electronic form—Publisher is the 'ECMA Technical Committee' in each case:

ECMA-179, June 1992, 'Services for Computer Supported Telecommunications Applications (CSTA) Phase I';

ECMA-180, June 1992, 'Protocol for Computer Supported Telecommunications Applications (CSTA) Phase I'.

These documents relate to a publication status identified as 'Phase 1' in which case if necessary further documents are also used in accordance with the 'Phase 2' and 'Phase 3' publication states available at the time of application.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 4A to FIG. 4C are chronological flowcharts for schematic representation of an exchange of control messages for implementation of call signaling in the overall communication system;

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
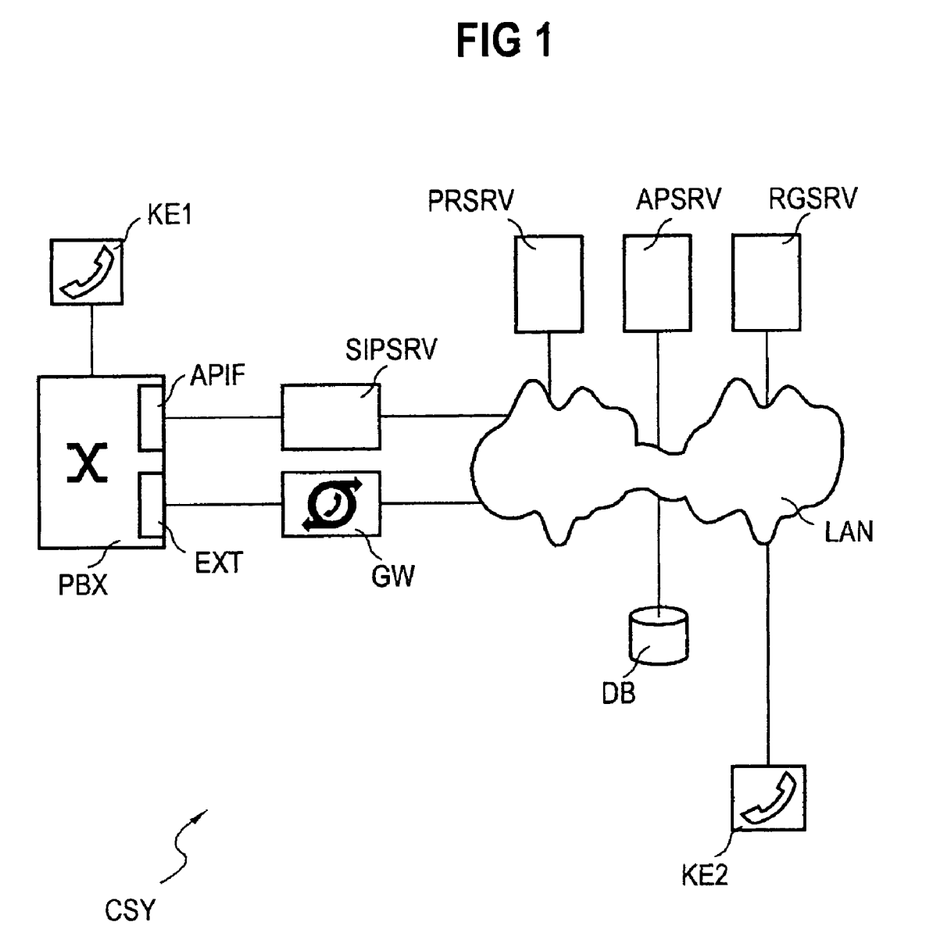
FIG. 1 is a structure diagram for schematic representation of a communication system.

FIG. 1 shows a communication system CSY. The communication system CSY is controlled by a central communication device PBX. This central communication device PBX can also be realized in alternative embodiments—in a normal technical way—as a network of communication devices—not shown. In the embodiment mentioned each central communication device PBX in the network of communication devices controls a subsystem CSY of the overall communication system—not shown—administered by the network of communication devices.

The central communication device PBX is for example designed in accordance with a time slot oriented switching method—also often referred to by experts as 'Time Division Multiplex', TDM. Control via signaling data and an exchange of payload—for example voice and/or video data—from communication terminals connected to the central communication device PBX, here the first communication terminal KE1, is undertaken for example by using the ISDN ('Integrated Services Digital Network') protocol.

The central communication device PBX has an interface EXT to expansion modules via which signaling and user information is exchanged with these expansion modules. User information is exchanged in the usual way with a ISDN protocol over what is known as a B channel, while exchange of signaling information is undertaken via a separate D channel.

The central communication device PBX also has an application interface APIF by which communication of the central communication device PBX with an application supporting a telephony function—not shown—embodied on a computer system is undertaken. An example—not shown—of these kind of applications, is what are known as business applications which are often used for integration of telephony functions in a customer inquiry handling system divided between a plurality of agents in what is known as a Call Center. The business application in this case exchanges what is known in technical circles as call control and monitoring information with the central communication device PBX.

Via a packet-oriented network LAN a number of communication terminals—the drawing merely shows a second communication terminal KE2 by way of an example—are interconnected on the basis of packet-oriented communication—also known as VoIP (Voice over Internet Protocol).

In the exemplary embodiment the 'Session Initiation Protocol', abbreviated to SIP, is used as a signaling protocol. This is a modular-structured protocol, which supports call signaling, localization and registration of communication terminals. In addition the method is independent of the choice of a specific communication system or signaling protocol and can thus be used for example for a signaling protocol in accordance with the ITU-T H.323 Standard.

The second communication terminal KE2 exchanges packet-oriented data with a corresponding communication partner or also with communication control servers PRSRV, APSRV, RGSRV executing control functions.

Localization of a user is controlled by a localization control server PRSRV. The localization control server is also known in technical circles as a 'Presence and Availability Server'. The Presence and Availability Server PRSRV administers available users as well as which users are available and how they are available. This administration is undertaken in the form of a notification to applications that support further SIP functionalities. These kinds of applications are for example executed on an APSRV or 'Application Server'. The Application Server APSRV also supports video or audio conference functions and controls or registers the availability of a user— in conjunction with the Presence and Availability Server PRSRV. To this end, the Application Server APSRV cooperates in some cases with basic clients, i.e. service providers that are available in other computer systems—not shown.

The Registration and Proxy Server RGSRV controls registration of an SIP user and if necessary initiates the routing of a call to be put through to the communication terminal KE2 registered for the user.

For support of operational or administrative switching and service feature functions and to support maintenance functions a database is assigned to the VoIP communication system LAN, also referred to in technical circles as the OAM (operation, Administration and Maintenance) database.

This means that the packet-oriented network LAN includes a communication subsystem—also referred to below as the VoIP communication system LAN—in which there is decentralized control of switching and service features, i.e. in distributed VoIP communication terminals such as the second communication terminal KE2 and with decentralized communication control servers PRSRV,APSRV,RGSRV. This VoIP communication system LAN is connected to the central communication device PBX.

The VoIP communication system LAN is connected via a control server SIPSRV connected to the application interface APIF of the central communication device PBX as well as via a gateway GW connected to the interface EXT of the central communication device PBX. The control server SIPSRV as well as the gateway GW are linked to the VoIP communication system LAN via network interfaces—not shown.

An exchange of control data in communication system CSY is explained in more detail below with reference to the functional units of FIG. 1.

Figure 2:
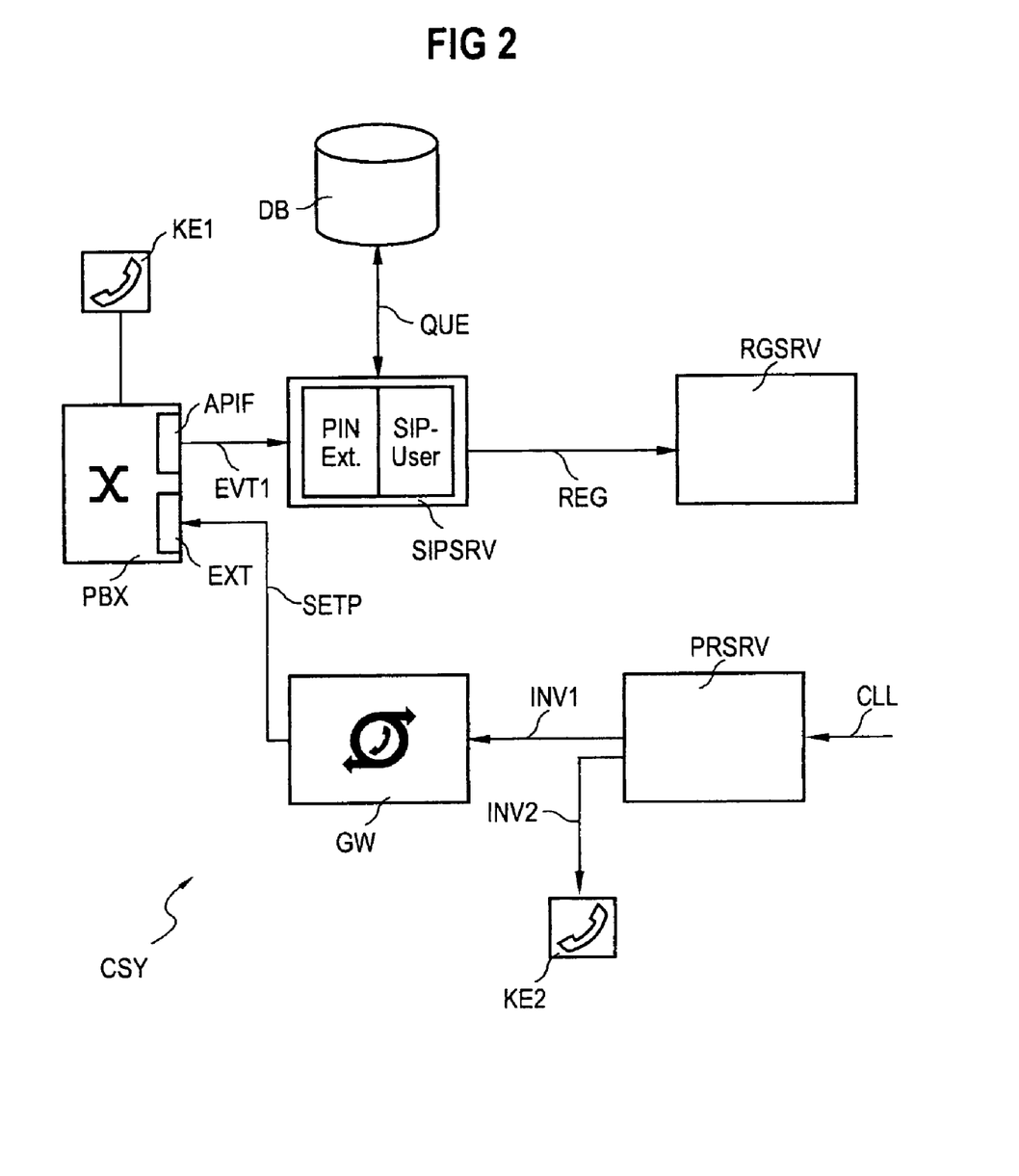
FIG. 2 is a structure diagram for schematic representation of an exchange of control messages in a communication system for transmitting voice data.

FIG. 2 shows a subset of components of communication system CSY already known from FIG. 1. An exchange of control data is illustrated below using FIG. 2. First of all a method is shown for registering a user in a VoIP communication system LAN. A user registers at a first communication terminal KE1 administered by the central communication device PBX by entering a personal identification number PIN.

A registration of the user in the VoIP communication system LAN is used for example to transfer or forward incoming calls received for the user to a VoIP communication terminal such as the second communication terminal.

For the purposes of this registration the communication data of the application interface APIF is evaluated and a registration message valid in a VoIP communication system LAN is generated. In accordance with the embodiment of the signaling protocol SIP embodied in the VoIP communication system LAN this registration message corresponds to an SIP message designed for registration purposes. For the generation of the registration message by control server SIPSRV communicating with the application interface APIF the PIN functionality is converted to the registration message The recipient of this registration message in the VoIP communication system LAN is for example the Registration Server RGSRV.

The application interface APIF is for example provided for a bidirectional exchange of communication data in accordance with the CSTA (Computer Supported Telephony Applications) protocol. In addition the method can be used with alternative communication protocols—not shown in the exemplary embodiment—for exchange of communication data of the central communication device PBX with a computer system—not shown.

The user registers at the central communication device PBX by entering a PIN assigned to him at the first communication terminal KE1. The communication terminal KE1 is then assigned to this user by the central communications device PBX. The assignment of the user identified by his PIN to the first communication terminal KE1 is notified via the application interface APIF with a CSTA event message EVT1 to the control server SIPSRV. This CSTA event message EVT1 is referred to in technical circles as 'Mobile User Activate', with the attribute 'mobile' expressing the fact that the user can register at a largely random terminal in the communication system CSY. The data transferred by the event message EVT to the control server SIPSRV contains for example the PIN to identify the user as well as an identification of the first communication terminal KE1 assigned to the user. The first communication terminal KE1 is identified for example by specifying what is often referred to in technical circles as the extension number of this communication terminal KE1.

The control server now has the task of using the PIN and the extension—abbreviated in FIG. 2 with 'Ext.'—to create a registration message REG for registering an SIP user. To do this a database query QUE to the database DB is initiated in the control server SIPSRV. The database contains a data set to assign an SIP user to the user's PIN. The result of this query QUE is notified to the control server SIPSRV. For example in this way a PIN containing '45898' is assigned to a text containing 'Christian' which characterizes the SIP user. In addition, for a mobile user, there is a write access to a data set of the database DB, through which the currently registered extension of the user in form of the extension number— extension—of the communication entry KE1 is entered into a data set of the database DB.

With the aid of the text entry—'Christian' characterizing the SIP user—a registration message REG is generated by the control server SIPSRV and sent to the Registration Server RGSRV. The registration messages REG contains for example in an information part the text contents 'Register: christian@sip.com' and 'Contact: 45898@sip.com'.

With the aid of a further information field in the database entries of the database DB, call forwarding or call diversion can be set on the VoIP communication system LAN side. Such an information field contains for example the identification number of the communication terminal, to which incoming calls are to be diverted.

This type of call forwarding or diversion is known in the form of a service feature provided by central communication devices PBX and is initiated at a communication device KE1 connected to the latter by entering a control command. The advantage of setting up call forwarding or diversion via the VoIP communication system LAN lies in the fact that the associated packet-oriented network LAN allows accesses from information networks spread around the world such as for example the Internet—not shown in the drawing. Provided there is a network access, it is possible for a user from almost any point, by a so-called SIP client—e.g. a portable computer unit—to initiate a diversion of his communication terminal KE1 to another diversion destination, for example the second communication terminal KE2. The diversion destination can alternately also be a communication terminal— not shown—assigned to the central communication device PBX.

The sections below show how further processing of an incoming call to an SIP user registered both at the central communication device PBX and also in the VoIP communication system, specifically in the Registration Server RGSRV, is undertaken.

Call signaling CLL in the form of SIP message arrives at the Presence and Availability Server PRSRV. This call signaling originates either from the VoIP communication system LAN or was obtained in the form of a CSTA message via the application interface APIF from the central communication device PBX. In the first case the origin of the incoming call is a communication terminal—not shown—within the VoIP communication system LAN, in the second case a communication terminal—not shown—assigned to the central communication device. The Presence and Availability Server PRSRV determines the communication terminal to which the call should be put through. For this purpose, the Presence and Availability Server PRSRV uses information to be obtained from the database DB via the Registration Server RGSRV. Depending on a configuration of the user determined using the information obtained, one or more invitation messages INV1,INV2 are then created and sent by the Presence and Availability Server PRSRV. A first invitation message INV1 is intended for putting the call through to the first communication terminal KE1, correspondingly a second invitation message INV2 for the second communication terminal KE2. The last-mentioned second invitation message INV2 is put through directly to the second communication terminal KE2.

The second invitation message INV2 contains the text content 'Invite christian@sip.com' in an information part for example, corresponding to the 'address' of the user in the VoIP communication system LAN.

The first invitation message INV1 contains the text content 'Invite: 45898@sip.com' in an information part for example corresponding to the identification number of the user in the central communication device PBX. This first invitation message INV1 is converted via the gateway into a signaling message SETP adapted to the central communication device PBX. This type of signaling message SETP corresponds for example to the DSS1 protocol and for example contains a setup command in an information part.

A method is explained below which, when implemented, makes it possible for a further common service feature embodiment in the VoIP communication system LAN as well as in the communication network administered by the central communication device PBX—merely shown in the drawing by the first communication terminal KE1.

Many central communication devices support what is known as a mailbox function. A 'mailbox' stores callback requests and messages from callers. At communication terminal KE1 a callback request or the presence of a message is signaled to the associated user e.g. by a visual indication.

To realize this service feature in the overall communication system CSY, as in the previous descriptions a first user is registered in the Registration Server RGSRV of the VoIP communication system LAN. The first communication terminal KE1 is assigned to the first user. If a second user now activates the mailbox function for the first user, by activating the 'please call back' service feature for example, a 'waiting message' is signaled at the first communication terminal KE1, also known in technical circles as 'Message Waiting Indication' or MWI for short.

For transmission of this MWI a routine is implemented with the control server SIPSRV, which at discrete time intervals executes an interrogation of MWI states via the application interface APIF to the central communication device. Such an interrogation is also known by experts as 'polling'. Such a polling process is undertaken repeatedly by routine with calls a CSTA request message 'getMessageWaitingIndicator' in the control server SIPSRV e.g. at on-minute intervals. The arguments of the CSTA request message are in this case an identification identifying communication terminal KE1. The CSTA response message contains a Boolean parameter which indicates a waiting message or not. If a there is a message waiting, this is sent in an information field of the response message to the control server SIPSRV which converts this into an SIP message and forwards it to the communication terminal KE2 registered for the first user in the VoIP communication system LAN.

The advantage of this method is that the first user now also receives messages if he is not at his first communication terminal KE1. The second communication terminal KE2 registered for him is for example embodied as a mobile communication unit KE2, e.g. in the form of a PDA ('Personal Digital Assistant').

The following FIGS. 3 to 7 is each show a chronological flowchart for schematic representation of an exchange of control messages between system units of communication system CSY. Control messages exchanged between the system units, mostly in the form of requests or confirmations are initiated in this case depending on specific actions executed or to be executed or events which have occurred in the relevant system units.

Figure 3:
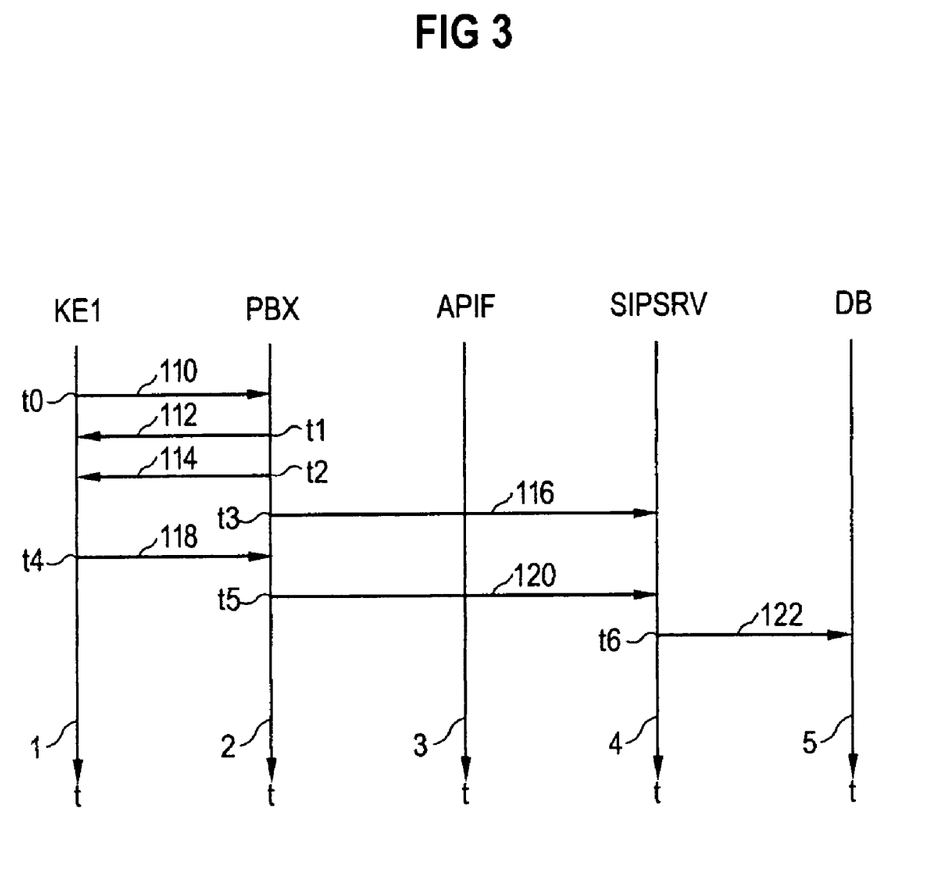
FIG. 3 is a chronological flowchart for schematic representation of an exchange of control messages for implementation of an evaluation of a user's call data.

FIG. 3 shows a chronological flowchart with a schematic representation of an exchange of control messages between system units of the communication system CSY. Time lines 1,2,3,4 and 5 are in this sequence assigned to the first communication terminals KE1, the central communication device PBX, the application interface APIF, the control server SIPSRV and also the database DB. Time lines 1,2,3,4 and 5 run from top to bottom, to that later points in time lie further down than earlier points in time.

The method shown below on the basis of control messages exchanged achieves a logging of connection or call data for users registered in a communication system CSY. Such logging is normally undertaken in control units of the central communication device PBX—not shown—for their assigned communication terminals KE1 but not accessible or able to be evaluated in server units such as for example the Application Server APSRV in VoIP communication system LAN. The method below achieves a transfer of connection or call data into the VoIP communication system LAN embodied as a packet oriented network whereby a normal access option to the packet-oriented network LAN is achieved by including worldwide networks. Connection or call data is stored for example with data records in the form of 'users, call type, start time of call, duration of call, connected user'. Depending on data protection regulations a data record can be shortened by a number of information elements. The data records are stored after a transfer—explained below—from the central communication device PBX to the control server SIPSRV in the database DB.

At point in time t0 the user registers at his first communication terminal KE1. A registration that has occurred is signaled in the form of an event message 110 from communication terminal KE1 to the central communication device PBX, this being generally referred to in technical circles as a 'SETUP' message 110.

A point t1 the central communication device PBX transfers an event message 112 to the communication terminal KE1, which transfers signaling of an incoming call and is also generally known in technical circles as an 'ALERTING' message 112.

At point t2 the central communication device PBX transfers an event message 114 to the first communication terminal KE1, which signals the fact that a call has been set up to the communication terminal KE1 and is also normally known in technical circles as a 'CONNECT' message 114.

Via the application interface APIF the call that has been set up is notified by the central communication device PBX together with further parameters—such as for example the user number of the calling user, the connection type etc. —in the form of a CSTA event message 116 to the connected control server SIPSRV as well. This event message 116 sent at point t3 is normally referred to in technical circles as 'CSTA ESTABLISHED EVENT'. The control server SIPSRV stores the additionally sent call data and traces the status of this connection in a process created for this connection.

At point t4 the first communication terminal transfers an event message 118 to the central communication device PBX, which signals that a call has been disconnected and is also normally known in technical circles as a 'DISCONNECT' message 118.

Via the application interface APIF the call that has been disconnected is notified by the central communication device PBX together with further parameters—such as for example the user number of the calling user, the connection type etc. —in the form of a CSTA event message 120 to the connected control server SIPSRV as well. This event message 120 sent at point t5 is normally referred to in technical circles as 'CSTA CONNECTION CLEARED EVENT'. Control server SIPSRV stores the additionally sent call data and traces the status of this connection in a process created for this connection.

Control server SIPSRV stores the additionally transferred call data and ends the process created for this connection with a generation of a call data record, which is sent at point t6 in an information field of a write access request 122 to the database DB.

Figure 4A:
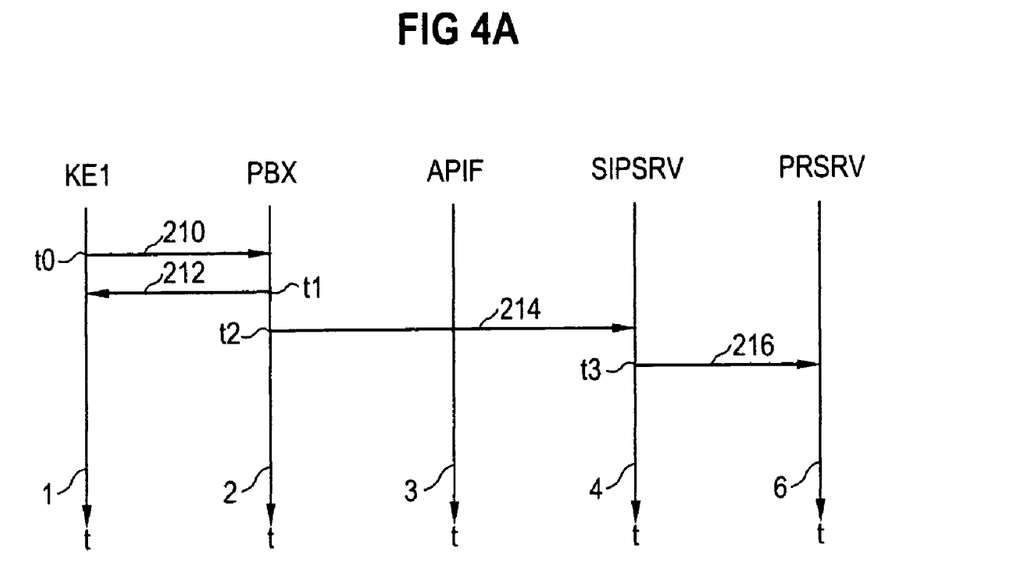
Figure 4B:
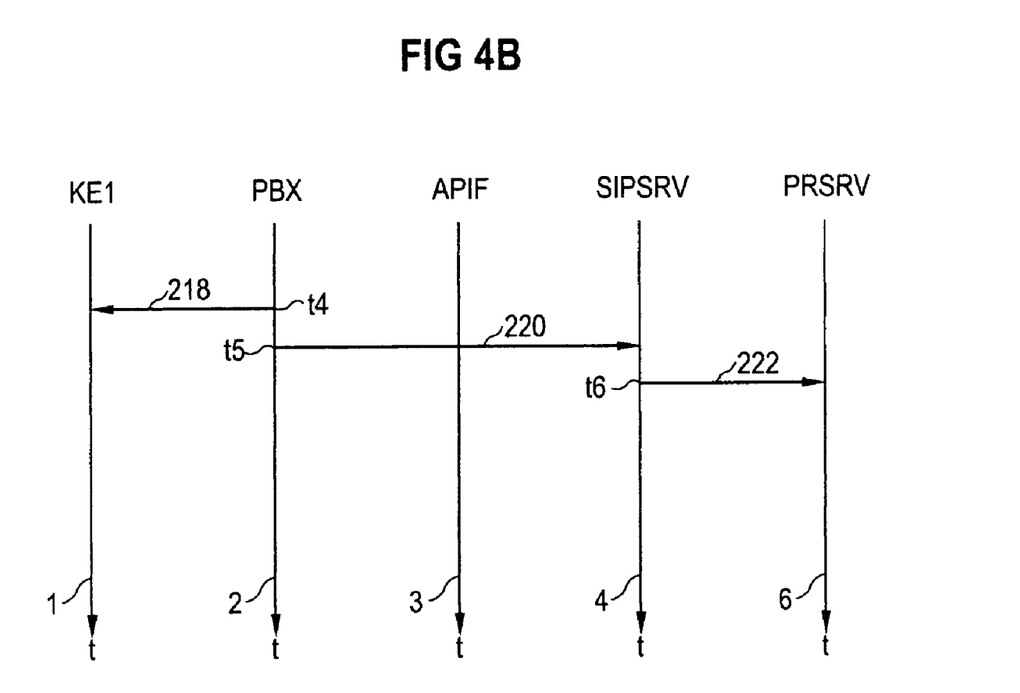
Figure 4C:
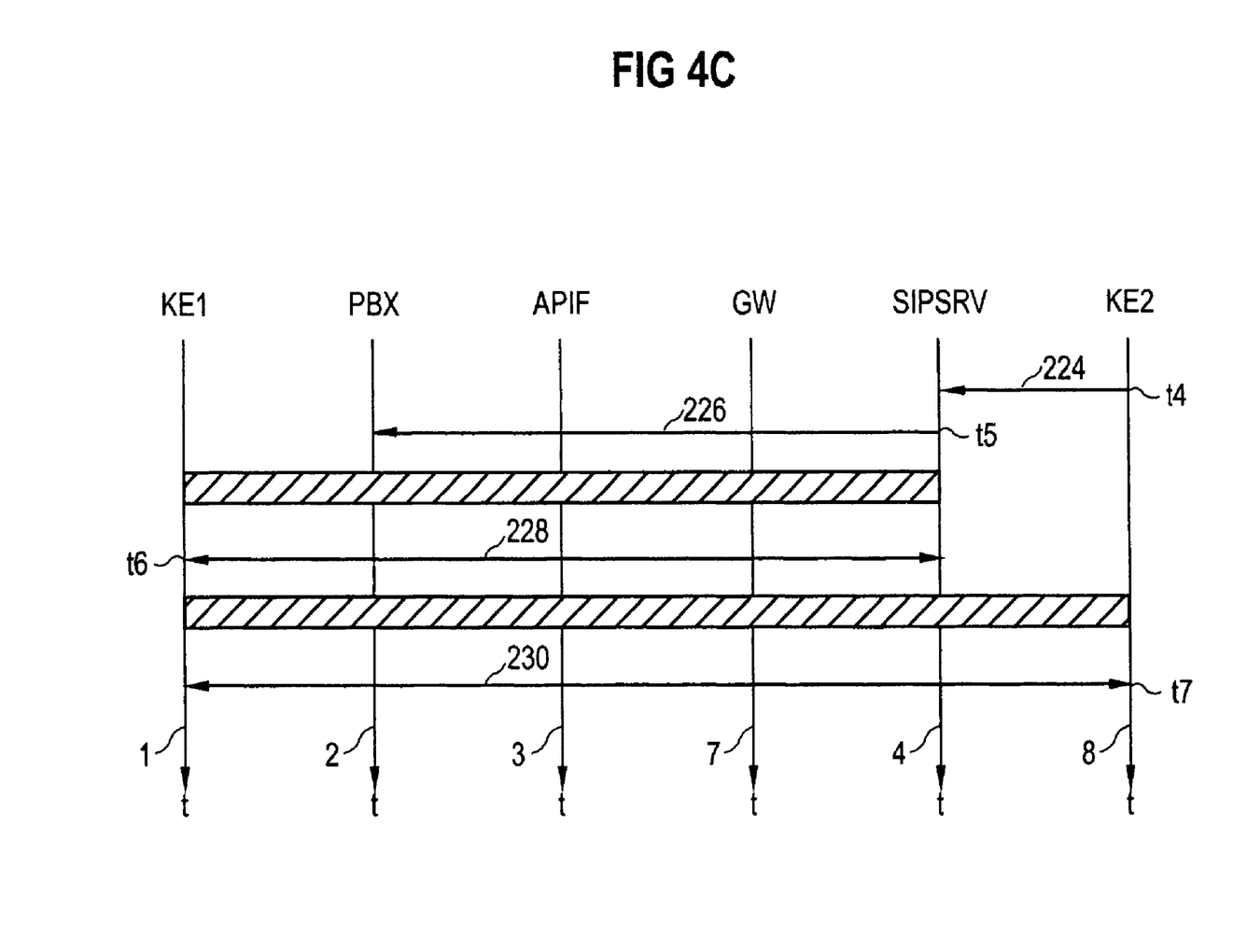

FIGS. 4A,4B,4C in their turn show a chronological flowchart with a schematic representation of an exchange of control messages between system units of the communication system CSY. This exchange of control messages is used for transferring connection requests arriving at the central communication device to the VoIP communication system LAN. The associated method is explained on the basis of the control messages exchanged.

Time lines 1,2,3,4 and 6 are assigned in this sequence to the first communication terminal KE1, the central communication device PBX, the application interface APIF, the control server SIPSRV as well as the Presence and Availability Server PRSRV. FIG. 4C shows a further time line 6 assigned to the gateway GW as well as a time line 8 assigned to the second communication terminal KE2.

With the method described below the transfer of an incoming call to communication terminal KE1 assigned to the central communication device PBX to a further communication terminal KE2 registered for the SIP user at the VoIP communication system LAN is achieved. In the reverse direction—not shown here—i.e. a transfer from a communication terminal KE2 assigned to the VoIP communication system LAN to the first communication terminal KE1, this transfer is controlled by gateway GW.

At point in time t0 the user registers at his first communication terminal KE1. A registration that has occurred is signaled in the form of an event message 210 from communication terminal KE1 to the central communication device PBX, this being generally referred to in technical circles as a 'SETUP' message 210.

A point t1 the central communication device PBX transfers an event message 212 to the communication terminal KE1, which transfers signaling of an incoming call and is also generally known in technical circles as an 'ALERTING' message 212.

Via the application interface APIF the call signaling is also notified from the central communication device PBX in the form of a CSTA event message 214 to the connected control server SIPSRV This event message 116 sent at point t3 is also normally referred to in technical circles as 'CSTA DELIVERED EVENT'.

At point t3 control server SIPSRV transfers an invitation message 216 to the Presence and Availability Server PRSRV, which is also referred to as an 'INVITE' message. The Presence and Availability Server PRSRV determines in a database—for example in an internal database not shown or also in the central database DB—from information contained in the invitation message 216 about the user, as to whether the latter is registered in the VoIP communication system LAN and whether the latter is assigned to a communication terminal there. For an assignment of communication terminals, the Presence and Availability Server PRSRV sends an invitation message—not shown—to each of these communication terminals. One of the communication terminals assigned to the user in the VoIP communication system LAN is for example the second communication terminal KE2.

The further method subdivides into two cases. In the first case—cf. FIG. 4B—the user receives the call at the first communication terminal KE1, in the second case—cf. FIG. 4C—the user receives the call at the second communication terminal KE2.

FIG. 4B shows a continuation of the chronological flowchart of exchanged messages with a call accepted by the user in the first communication terminal KE1 assigned to the central communication device PBX.

At point t4 the central communication device PBX transfers an event message 218 to the first communication terminal KE1, which signals the fact that a call has been set up to the communication terminal KE1 and is also normally known in technical circles as a 'CONNECT' message 218.

Via the application interface APIF this call setup is also notified from the central communication device PBX in the form of a CSTA event message 220 to the connected control server SIPSRV. This event message 220 sent at point t5 is normally referred to in technical circles as a 'CSTA ESTABLISHED EVENT.

The task of control server SIPSRV now relates to ending the call signaling with the communication terminals KE2 registered to the user in the VoIP-communication system LAN.

To this end, at point t6, the control server SIPSRV transfers a cancellation message 222 to the Presence and Availability Server PRSRV which is also referred to as a 'CANCEL' message. In a database the Presence and Availability Server PRSRV determines from information about the user contained in the cancellation message 222 which call signaling is to be ended in which communication terminals KE2 assigned to the users in the VoIP communication system LAN. After determining all this information the Presence and Availability Server PRSRV sends a cancellation message—not shown—to each of these communication terminals KE2.

FIG. 4C shows a continuation of the chronological flowchart of exchanged control messages with a call accepted by the user in the second communication terminal KE2 assigned to the VoIP communication system LAN.

After receipt of the communication connection at the second communication terminal the second communication terminal KE2 transfers at point t4 an event message 224 to the communication control server SIPSRV which notifies to the latter the fact that a connection has been established and is also known in technical circles as a 'CONNECT' message 224.

Below a first communication connection is initially established between the control server SIPSRV and the second communication terminal. The control server SIPSRV additionally establishes a second communication connection to the user at the first communication terminal KE1 assigned to the central communication device PBX at which the first communication connection is retained. In the course of a so-called 'multi step transfer' the two communication connections are then linked so that the user can eventually accept the incoming call arriving at the first communication terminal KE1 at the second communication terminal KE2.

For the purposes of representing the communication connection more clearly a time line assigned to the communication terminal KE1 is introduced in FIG. 4C. It should be noted that, with the representation shown, control, signaling or payload is not being exchanged with the actual communication terminal KE1 but rather with an entity administering the communication terminal KE1 in the central communication device PBX. Showing two time lines 1, 2 for the entity of the first communication terminal KE1 in the central communication device PBX as well for the central communication device PBX itself is used for purposes of differentiation. A communications connection is established with the entity of the first communication terminal KE1 while the central communication device PBX itself is responsible for control of the communication connection.

The control server sends via the application interface APIF at point t5 a CSTA request message 226 to the central communication device PBX, requesting a diversion of the communication connection. This request message 226 is also normally referred to in technical circles as a 'CSTA DEFLECT CALL REQUEST'. A crossing of the request messages 226 with time line 7 of gateway GW for the purposes of illustration is not to be evaluated as indicating that request message 226 actually passes gateway GW.

The entity of the first communication device KE1 then exchanges signaling or control messages with the control server SIPSRV which relate to the setup of the communication connection and which are familiar to the expert from the DSS1 Specifications 'Supplementary Services' or the 'SIP Recommendations' for a transfer of communication connections. The setup of the communication connection is shown in the drawing by a cross-hatched block. For exchange of payload gateway GW is used in this case.

After the first communication connection has been established between the entity of the first communication device KE1 and the control server SIPSRV, the two partners of the communication connection confirm to each other at point t6 the successful setup with the aid of a pair of confirmation messages 228—shown in the drawing as a doubled-headed arrow.

The second communication connection between the second communication terminal KE2 and entity of the first communication terminal already mentioned—shown in the drawing by a cross-hatched block—is created after the pair of confirmation messages 228 have been exchanged, with this second communication link being confirmed in a similar way with a pair of confirmation messages 230—shown in the drawing as a double-ended arrow connection. This diverts the call to the second communication terminal KE2.

Figure 5:
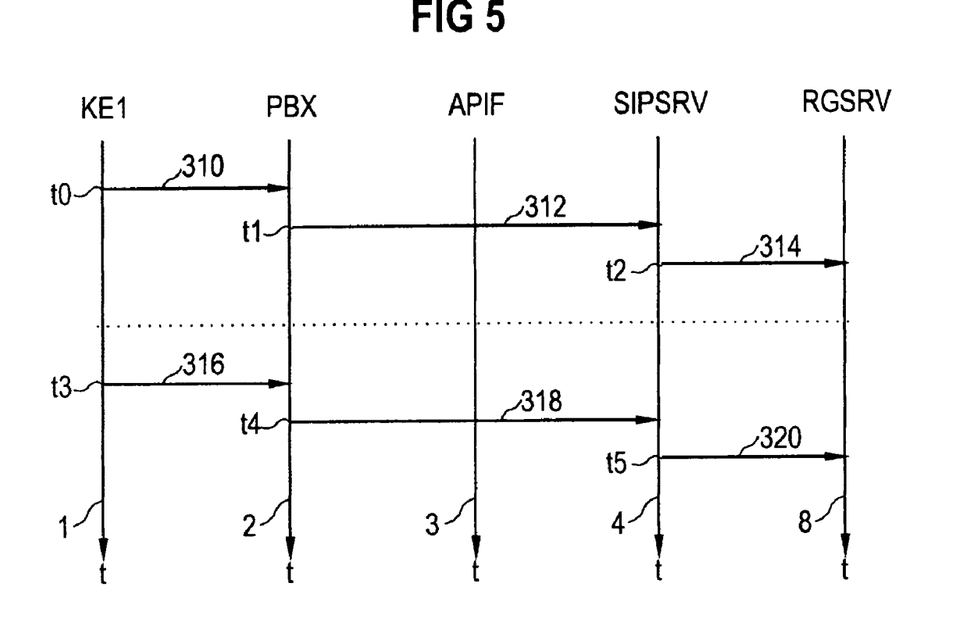
FIG. 5 is a chronological flowchart for schematic representation of an exchange of control messages for implementation of a communication system-wide availability information of a user.

FIG. 5 is a chronological flowchart to schematically show an exchange of control messages for implementation of communication system-wide availability information of a user.

The background of the method described below is that a user registered at a terminal KE1 assigned to the central communication device PBX, who is currently making a call at this communication terminal KE1 is to be registered as 'not available' in the VoIP-communication system LAN. This status is notified by non-availability information—'busy information' or 'Off Hook Condition'—by the central communication device PBX to the VoIP communication system LAN to inform a calling user from the VoIP communication system LAN about the non-availability of the called user.

Non-availability information requested before call setup also has the effect that, in the event of the first communication terminal KE1 being busy, no communication connection between the calling user in the VoIP communication system LAN is set up via the gateway GW and the central communication device PBX to the first communication terminal KE1. This measure also has the advantage to saving network bandwidth.

The method will again be described on the basis of control messages exchanged. Time lines 1,2,3,4 and 8 are assigned in this sequence to the first communication terminal KE1, the central communication device PBX, the application interface APIF, the control server SIPSRV as well as the Presence and Availability Server PRSRV. Time lines 1,2,3,4 and 8 run from top to bottom, so that later points in time lie further down than earlier points in time.

The first user lifts the handset at his first communication terminal KE1 or seizes an assigned line resource at the software application KE1. At point t0 this event is transferred from the first communication terminal KE1 to the central communication device PBX in the form of an event message 310.

The event of lifting the handset by the user is also notified at point t1 from the central communication device PBX via the application interface APIF to the control server SIPSRV in the form of an event message 312. This CSTA event message 312 is also normally referred to in technical circles as a 'SERVICE INIT EVENT'.

The control server SIPSRV accepts the event message 312 and processes this. At point t2 the control server sends a request message 314 to the Registration Server RGSRV—'SIP Registrar'—which initiates a deregistration of the communication terminal in data sets of the Registration Server RGSRV. The request message 314 is also normally referred to in technical circles as a 'REGISTER' message 314 and informs the Registration Server RGSRV by an argument set to the value (0) known as an 'EXPIRE' argument, about logging off or deregistration of the first communication terminal KE1.

The Registration Server RGSRV, after the request message 314 is received, undertakes a change in the data sets reserved for the communication terminal KE1 as a result of which this is now flagged as 'not available'.

After a period—shown in the drawing by a dotted line—in which the user at the communication terminal KE1 maintains an active communication connection, the latter ends this connection by replacing the handset for example.

At point t3 this event is transferred from the first communication terminal KE1 to the central communication device PBX in the form of an event message 316.

This event is notified at point t4 by the central communication device PBX via the application interface APIF to the control server SIPSRV in the form of an event message 318. This CSTA event message 318 is also normally referred to in technical circles as a 'CONNECT CLEARED EVENT'.

The control server SIPSRV accepts the event message 318 and processes this. At point t5 the control server SIPSRV sends a request message 320 to the Registration Server RGSRV which initiates a deregistration of the communication terminal KE1 in data sets Registration Server RGSRV. The request message 320 is also normally referred to in technical circles as a 'REGISTER' message 320 and informs the Registration Server RGSRV by what is known as an 'EXPIRE' argument set to a value greater than zero (0) about a logon or registration of the first communication terminal KE1.

Figure 6:
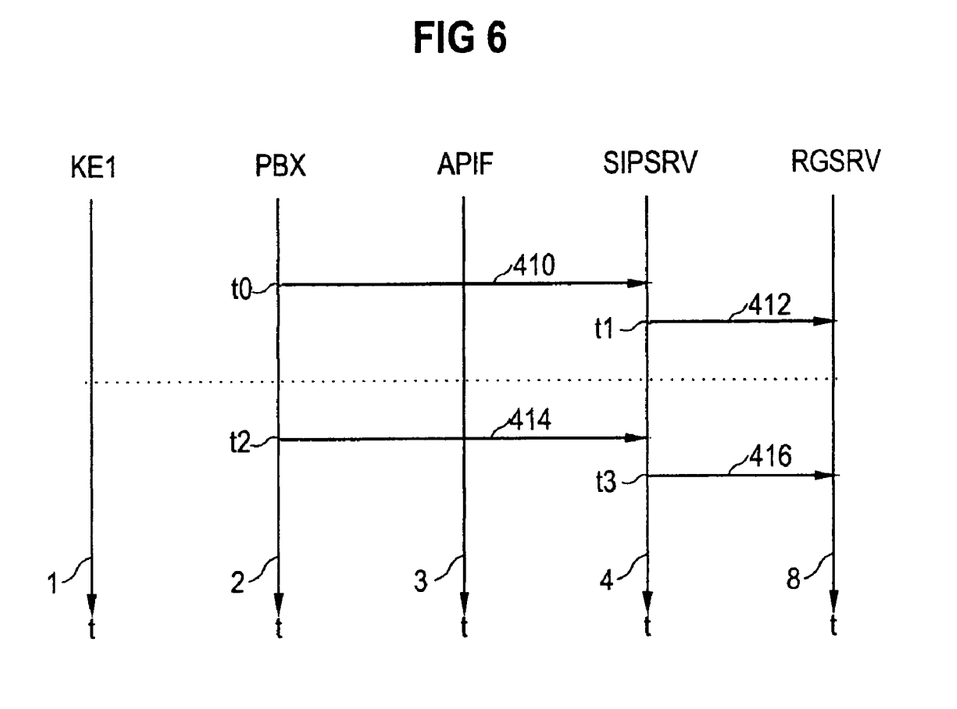
FIG. 6 is a chronological flowchart for schematic representation of an exchange of control messages for implementation of a communication system-wide availability information of a user as a result of a failure of a communication terminal.

The Registration Server RGSRV, after the request message 320 is received, undertakes a change in the data sets reserved for the communication terminal KE1 as a result of which this is now flagged as 'available'. In FIG. 6 a method largely similar to that described in FIG. 5 is shown in a chronological flowchart with a schematic representation of an exchange of control messages for implementation of a communication system-wide availability information of a user. By contrast with the method according to FIG. 5, non-availability or availability of the user with the method now shown is based on the fact that the first communication device KE1 assigned to the user is taken out of operation or put back into operation. An out-of-operation-status is for example caused by unplugging the connection between the communication terminal KE1 and a line with connecting socket connecting the communication terminal KE1 with the central communication device PBX—not shown. The fact that the first communication terminal KE1 has gone out of operation is notified at point t0 with an event message 410 from the central communication device PBX via the application interface APIF to the control server SIPSRV. This CSTA event message 410 is normally also referred to in technical circles as an 'outOfService event'.

The communication terminal KE1 is deregistered in a similar way to the exemplary embodiment explained on the basis of FIG. 5, with the control messages 314 or 320 in this Figure corresponding to the control messages 412 or 416 shown in FIG. 6. The fact that the first communication terminal KE1 has been put back into service is notified at point t2 with an event message 414 from the central communication device PBX via the application interface APIF to the control server SIPSRV. This CSTA event message 414 is normally also referred to in technical circles as a 'BackInService event'.

Figure 7:
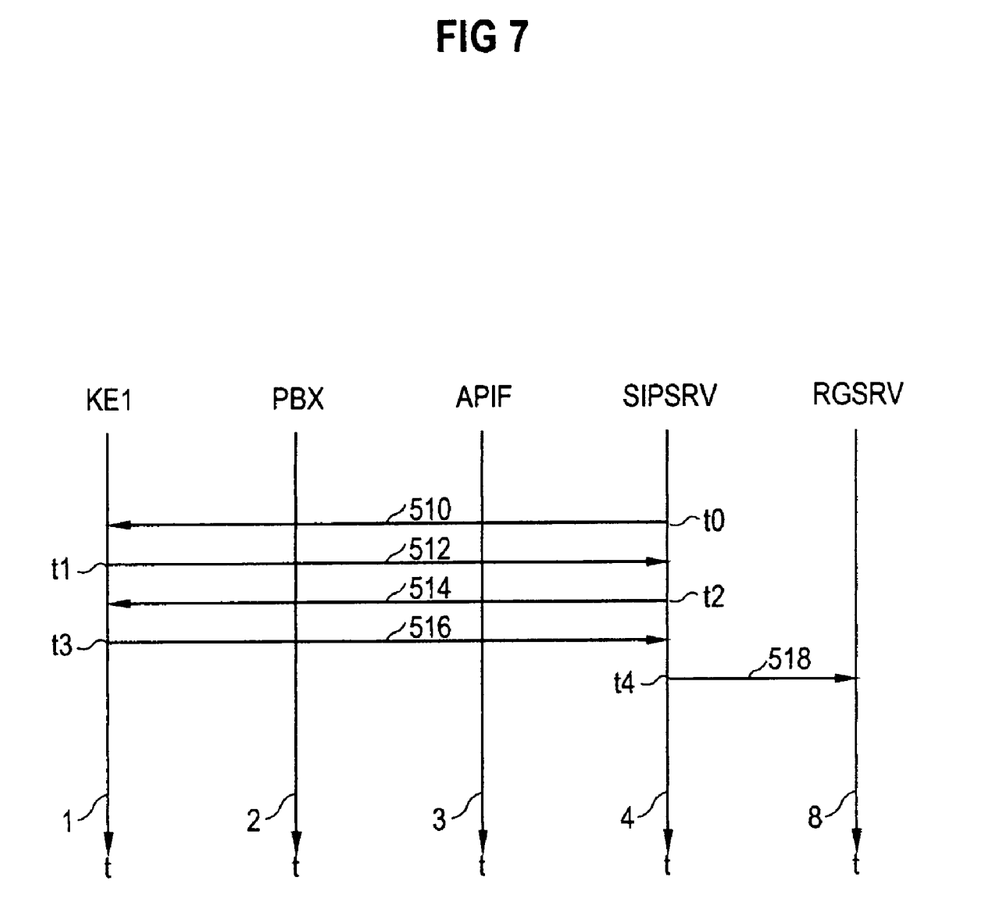
FIG. 7 is a chronological flowchart with a schematic representation of a synchronization of control data.

FIG. 7 shows a chronological flowchart with a schematic representation of an exchange of control messages for implementation of a communication system-wide synchronization.

The background to said synchronization is as follows: If a user registers at his first communication terminal KE1 assigned to the central communication device, he also suppresses a registration—undertaken with the aid of a previously-mentioned method—in the VoIP—communication system LAN at a second communication terminal KE2 assigned to him there.

When the control server SIPSRV starts up however there is thus far no provision for a function which checks a registration—also known as 'PIN Code Activation'—of all monitored communication terminals in the VoIP communication system LAN. So if the user registers while the control server is out of operation because of maintenance measures or as a result of a malfunction or is in a non-communicating state, an undefined status occurs.

The above-mentioned problems are resolved with the method described below—again using exchanged control messages.

When control server SIPSRV starts up, a status map—also known in technical circles as a snapshot—is interrogated for registration information of each communication terminal assigned to the VoIP communication system LAN via the application interface. This method, using a 'Snapshot Device Service' for dynamic status mapping can, in addition to determining registration information, also be used for any other adaptation to dynamic status transitions, for example to determine call states, service features offered etc.

Similar to the execution undertaken in FIG. 4C it should also be noted in FIG. 7, that control and signaling data is not exchanged with the actual communication terminal KE1 but with an entity administering the communication terminal KE1 in the central communication device PBX. Showing two time lines 1,2 for the entity of the first communication terminal KE1 in the central communication device PBX as well as for the central communication device PBX requires the exemplary representation of an entity of a communication terminal, with there being a similarly designed entity—not shown—for each of the communication terminals administered by the central communication device PBX.

At point t0 the control server SIPSRV sends a request message 510 via the application interface APIF to the entity of the communication terminal KE1, which indicates a beginning of a data identifying service—'Monitor Service'. This request message 510 is also normally referred to in technical circles as 'startMonitor'.

At point t1 the entity of the communication terminal KE1 sends a positive confirmation message 512 to the control server SIPSRV which signals a positive confirmation of request message 510. This confirmation message 512 is also normally known in technical circles as a 'positiveMonitorResponse'.

At point t2 the control server SIPSRV sends a request message 514 via the application interface APIF to the entity of the communication terminal KE1, which indicates a beginning of a services for dynamic status mapping. This request message 514 is also normally referred to in technical circles as 'SnapshotDeviceService'. An information field of request message 514 contains arguments for identification of the service or of the communication terminal KE1 and for the type of requested data.

At point t1 the entity of communication terminal KE1 sends a status message 516 to the control server SIPSRV in response to the request message 514. An information field of status message 516 contains the previously requested data, for example information about whether the PIN of the first communication terminal KE1 was activated. This status message 516 is also normally referred to in technical circles as 'snapshotDeviceData'.

The control server SIPSRV accepts the status message 516 and processes this. At point t4 the control server sends a request message 518 to the Registration Server RGSRV—'SIP Registrar'—which, with an existing PIN activation initiates registration of the first communication terminal KE1 in data sets of the Registration Server RGSRV. The request message 518 is also known in technical circles as a 'REGISTER' message 518 and informs the Presence and Availability Server PRSRV, depending on the value of the 'EXPIRE' argument that it contains—cf. above—about the deregistration or registration of the first communication terminal KE1.

The invention has been described in detail with particular reference to preferred embodiments thereof and examples, but it will be understood that variations and modifications can be effected within the spirit and scope of the invention.

The invention claimed is:

1. A method for integration of a packet-oriented network in a communication system, comprising:
   exchanging centralized signaling and service data through a central communication device;
   exchanging communication data between an application interface of the central communication device and a packet-oriented data communication system that is not a public switched telecommunications network;
   assigning a plurality of communication control servers to the packet-oriented network, the communication control servers including at least one signaling and payload servers and including at least one exchange server;
   implementing decentralized signaling and payload services through the at least one signaling and payload server by communicating decentralized signaling and payload;
   using a gateway for bilateral exchange of the centralized signaling and payload and the decentralized signaling and payload; and
   bilaterally converting the communication data between the application interface and the packet-oriented network, the communication data being bilaterally converted with the at least one exchange server.

2. The method according to claim 1, wherein the data through signaling and service data is exchanged according to a session initiation protocol.

3. The method according to claim 1, wherein the communication data is structured according to a Computer Telephony Applications Protocol.

4. The method according to claim 1, wherein
   a user registered at a first communication terminal is registered at a second communication terminal connected to the packet-oriented network if the second communication terminal is marked as available for the user.

5. The method according to claim 4, wherein
   to register the second communication terminal marked as available for the user and connected to the packet-oriented network, an event message is transferred via the application interface to the exchange server, which evaluates the event message.

6. The method according to claim 5, wherein
   a Registration Server is connected to the packet oriented network, and
   after the exchange server evaluates the event message, the exchange server transfers a registration message to the Registration Server.

7. The method according to claim 1, wherein
   a Presence and Availability Server and a Registration Server are connected to the packet-oriented network,
   call signaling messages arrive at the Presence and Availability Server,
   the Presence and Availability Server takes information for a called user from the call signaling messages, and
   the Registration Server retrieves information on the availability of the called user.

8. The method according to claim 7, wherein
   if the called user is available, an invitation message is sent to a terminal assigned to the called user.

9. The method according to claim 8, wherein
   if the terminal assigned to the called user is a terminal of the central communication device, then the invitation message is sent via the gateway.

10. The method according to claim 9, wherein
    the gateway converts the invitation message into a signaling protocol used by the central communication device.

11. The method according to claim 1, wherein
    call data is logged using an event message transferred via the application interface to the exchange server.

12. The method according to claim 11, wherein
    the event message is generated as a result of a call setup or a call clearing of a communication terminal assigned to the central communication device.

13. The method according to claim 11, wherein
    the exchange server determines call data based on the event message and transfers the call data in the form of a data record to a storage device.

14. The method according to claim 13, wherein
    the data record contains information about a user, information about whom the user is connected to, information about the type of call, and information about a start time and duration of the call.

15. The method according to claim 1, wherein
    a change of an availability state of a communication terminal connected to the packet-oriented network is notified by the exchange server via the application interface to the central communication device.

16. The method according to claim 15, wherein
    a negative availability state of the communication terminal occurs when:
    there is an existing communications connection or a connection is established at the communication terminal;
    the communication terminal is disconnected from the packet-oriented network; or
    the communication terminal has a defect.

17. The method according to claim 15, wherein a negative availability state of the communication terminal connected to the packet-oriented network is notified via the application interface and is interpreted in the central communication device as busy state.

18. The method according to claim 1, wherein
    when putting the exchange server into service a status image of all communication terminals assigned to the central communication device is created through status messages obtained via the application interface.

19. The method according to claim 18, wherein the status image contains registration information of each communication terminal assigned to the central communication device.

20. A system to integrate a packet-oriented network in a communication system, comprising:
    a plurality of communication control servers assigned to the packet-oriented network to implement decentralized signaling and payload services and exchange decentralized signaling and payload, the communication control servers including at least one exchange server to exchange communication data;
    a central communication device comprising:
       at least one interface to communicate centralized signaling and payload; and
       an application interface to exchange communication data with a computer system via the exchange server assigned to the packet-oriented network; and
    a gateway to bilaterally convert the centralized signaling and payload and the decentralized signaling and payload.

* * * * *